United States Patent
Murayama et al.

(10) Patent No.: US 7,637,828 B2
(45) Date of Patent: Dec. 29, 2009

(54) BELT-TYPE CONTINUOUSLY VARIABLE TRANSMISSION AND STRADDLE-TYPE VEHICLE INCLUDING THE SAME

(75) Inventors: Takuji Murayama, Shizuoka (JP); Yousuke Ishida, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 51 days.

(21) Appl. No.: 11/946,724

(22) Filed: Nov. 28, 2007

(65) Prior Publication Data
US 2008/0125256 A1 May 29, 2008

(30) Foreign Application Priority Data
Nov. 29, 2006 (JP) .............................. 2006-322066
Jan. 26, 2007 (JP) .............................. 2007-016490

(51) Int. Cl.
- F16H 7/02 (2006.01)
- B62K 11/00 (2006.01)
- F16H 9/18 (2006.01)
- B21D 35/00 (2006.01)

(52) U.S. Cl. ............................. 474/14; 474/12; 474/13; 474/16

(58) Field of Classification Search .................... 474/14, 474/13; 180/219; *F16H 7/02, 9/18*
See application file for complete search history.

(56) References Cited

U.S. PATENT DOCUMENTS

| | | | | | |
|---|---|---|---|---|---|
| 6,086,492 | A | * | 7/2000 | Nakano et al. | ................ 474/16 |
| 2006/0258492 | A1 | * | 11/2006 | Wu et al. | ...................... 474/13 |

FOREIGN PATENT DOCUMENTS

| | | |
|---|---|---|
| DE | 3816836 A1 | 11/1989 |
| EP | 1462352 A1 | 9/2004 |
| GB | 2142591 A | 1/1985 |
| JP | 08061448 A * | 3/1996 |
| JP | 2002-301525 | 10/2002 |
| WO | WO 03/085278 A1 | 10/2003 |

OTHER PUBLICATIONS

European Search Report for corresponding European application 07024156.7 lists the references above.

* cited by examiner

*Primary Examiner*—Robert A Siconolfi
*Assistant Examiner*—San Aung
(74) *Attorney, Agent, or Firm*—Hogan & Hartson LLP

(57) ABSTRACT

A belt-type continuously variable transmission that is easily manufactured includes a belt wound around a primary sheave and a secondary sheave. The primary sheave includes a fixed sheave member, a movable sheave member, a cam plate, and a roller weight. The movable sheave member has a guide rib extending toward the cam plate. The cam plate has a slider having a guide groove. The position of the radially outer portion of an end surface of the slider is shifted toward the right in the rotation axis extending direction from the position of the radially inner portion of the end surface.

8 Claims, 15 Drawing Sheets

BELT-TYPE CONTINUOUSLY VARIABLE TRANSMISSION AND STRADDLE-TYPE VEHICLE INCLUDING THE SAME

RELATED APPLICATIONS

This application claims the benefit of priority under 35 USC 119 of Japanese patent application no. 2006-322066, filed on Nov. 29, 2006, and Japanese patent application no. 2007-016490, filed on Jan. 26, 2007, which applications are hereby incorporated by reference in their entireties.

BACKGROUND OF THE INVENTION

1. Field of the Invention

The present invention relates to a belt-type continuously variable transmission for a straddle-type vehicle.

2. Description of Related Art

A straddle-type vehicle having a belt-type continuously variable transmission is known in which a primary sheave receives driving force from an engine, and a secondary sheave receives the driving force from the primary sheave via a belt. At least either the primary or secondary sheave has a variable belt winding diameter, and a speed change ratio is controlled by varying a ratio of the primary sheave belt winding diameter to the secondary sheave belt winding diameter.

The primary sheave typically includes a primary movable sheave member opposed to a primary fixed sheave member. The primary fixed and movable sheave members form a substantially V-shaped belt groove around which a belt is wound. The primary movable sheave member is movable in a rotational axis direction to change its position from the primary fixed sheave member. That is, the primary movable sheave member can move closer to or away from the primary fixed sheave member.

The primary sheave has a cam plate opposed to a side of the primary movable sheave member opposite to a side facing the primary fixed sheave member. The cam plate does not change its position in an axial direction from the primary fixed sheave member. The primary movable sheave member has a plurality of guide ribs extending toward and engaging and sliding in guide grooves formed in the cam plate to prevent rotation of the primary movable sheave member relative to the cam plate and to slidingly guide the primary movable sheave member in the axial direction.

A plurality of roller weights movable in the radial direction of the primary sheave and capable of circulating with rotations of the primary movable sheave member and the cam plate are provided between the primary sheave member and the cam plate. The primary movable sheave member has a plurality of stoppers extending toward the outer circumference of the cam plate that determine the maximum shift positions of the roller weights toward the outside in the radial direction.

Similar to the primary sheave, the secondary sheave includes a secondary movable sheave member opposed to a secondary fixed sheave member. The secondary fixed and movable sheave members form a substantially V-shaped belt groove around which the belt is wound. The secondary movable sheave member is urged by a spring in a direction where a width of the belt groove is narrowed, that is, a direction where a distance from the secondary fixed sheave member is decreased.

When the rotation speed of the primary sheave is low, the width of the belt groove of the secondary sheave is kept small by the urging force of the spring. Thus, the belt winding diameter of the secondary sheave becomes relatively large and the belt is pulled toward the secondary sheave. By this pulling force, the roller weights are retained near the rotation axis, and the width of the belt groove of the primary sheave is kept relatively large. As a result, the speed change ratio increases.

When the rotation speed of the primary sheave increases, the centrifugal force acting on the roller weights increases accordingly, and the roller weights shift toward the outside in a radial direction while pressing the primary movable sheave member toward the primary fixed sheave member. As a result, the belt winding diameter of the primary sheave enlarges, the belt is pulled toward the primary sheave, and the belt winding diameter of the secondary sheave decreases. Thus, the rotation speed of the primary sheave and the revolution of the engine increases, and the speed change ratio decreases. The speed change ratio becomes a minimum when the roller weights reach maximum shift positions where they contact the stoppers, in which condition the width of the belt groove of the primary sheave becomes the minimum.

[Structure of a Related-Art Primary Sheave]

A structure of a primary sheave in related art is described with reference to FIGS. 14 and 15. FIG. 14 is a cross-sectional view of a related-art primary sheave 136 disclosed in Japanese Patent No. 008,214. FIG. 15 is a plan view of primary sheave 136 as viewed from a cam plate 160. Primary sheave 136 has a fixed sheave member 136a, a movable sheave member 136b, cam plate (ramp plate) 160 and a roller weight (centrifugal weight) 144 provided between movable sheave member 136b and cam plate 160.

A plurality of guide ribs 155 extending in a radial direction are provided on a radially outer portion of a surface of movable sheave member 136b on the cam plate 160 side at equal intervals in a circumferential direction of primary sheave 136. Sliders 162, each of which has a sliding groove (guide groove) 163 with which a corresponding guide rib 155 slidingly engages, are fitted to cam plate 160. The engagement between sliding grooves 163 of sliders 162 and guide ribs 155 prevents rotation of cam plate 160 relative to movable sheave member 136b. When cam plate 160 moves in the axial direction to change its position relative to movable sheave member 136b, cam plate 160 is guided in the axial direction of primary sheave 136 by the sliding of guide ribs 155 in sliding grooves 163.

According to the related art illustrated in FIGS. 14 and 15, each attachment portion 160a of sliders 162 provided on tapered cam plate 160 is formed by deep drawing to expand toward movable sheave member 136b, such that the direction of slider 162 (opening direction of sliding groove 163) crosses the sliding direction of slider 162 (that is, the axial direction of primary sheave 136) at right angles. See also JP-A-2002-301525 (particularly FIG. 1) and Japanese Patent No. 323,803 particularly FIG. 2).

However, the processing of deep drawing on cam plate 160 is extremely difficult, which makes manufacture of the belt type continuously variable transmission difficult.

SUMMARY OF THE INVENTION

The invention has been developed to solve these problems and provides a belt type continuously variable transmission that can be easily manufactured.

A belt-type continuously variable transmission according to the invention includes a belt wound around a primary sheave and a secondary sheave. The primary sheave rotates around a rotation axis and includes a first sheave member, a second sheave member, a cam plate and a pressing member. The primary sheave can shift in a rotation axis extending direction. The second sheave member is opposed to and shifted from the first sheave member toward one side of the rotation axis extending direction. The first sheave member and the second sheave member form a belt groove around which the belt is wound. The cam plate is opposed to and shifted from the first sheave member toward the other side of the rotation axis extending direction. The cam plate and the first sheave member form a space which narrows toward the radially outside portion of the first sheave member and in which the pressing member is disposed. The pressing member circles around the rotation axis in accordance with rotation of the first sheave member, and narrows the width of the belt groove by shifting toward the radially outside portion of the first sheave member while pressing the first sheave member against the second sheave member by centrifugal force generated during circling.

The first sheave member has a guide member that extends toward the cam plate. The cam plate has a slide member with a guide groove that engages the guide member such that the slide member can slide relative to the guide member. The position of the radially outer portion of the end surface of the slide member on the other side of the rotation axis extending direction is shifted toward the one side of the rotation axis extending direction from the position of the radially inner portion of the end surface of the slide member on the other side of the rotation axis extending direction.

A straddle-type vehicle according to the invention includes this belt-type continuously variable transmission.

A belt-type continuously variable transmission provided according to the invention can be easily manufactured.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 14:
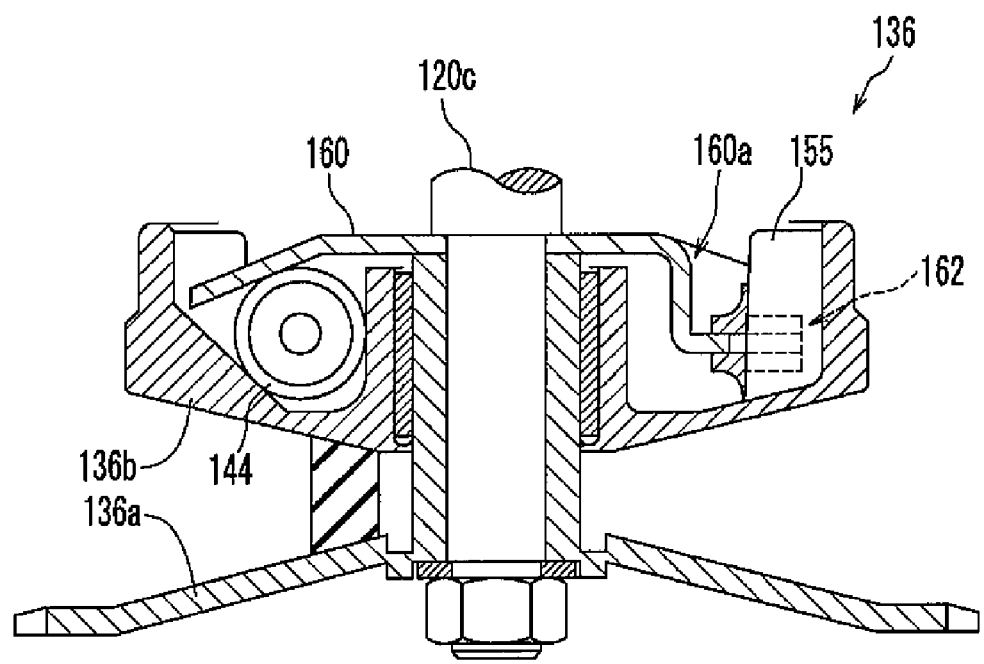
FIG. 14 is a cross-sectional view of a primary sheave according to related art shown in Japanese Patent No. 008,214.
Figure 15:
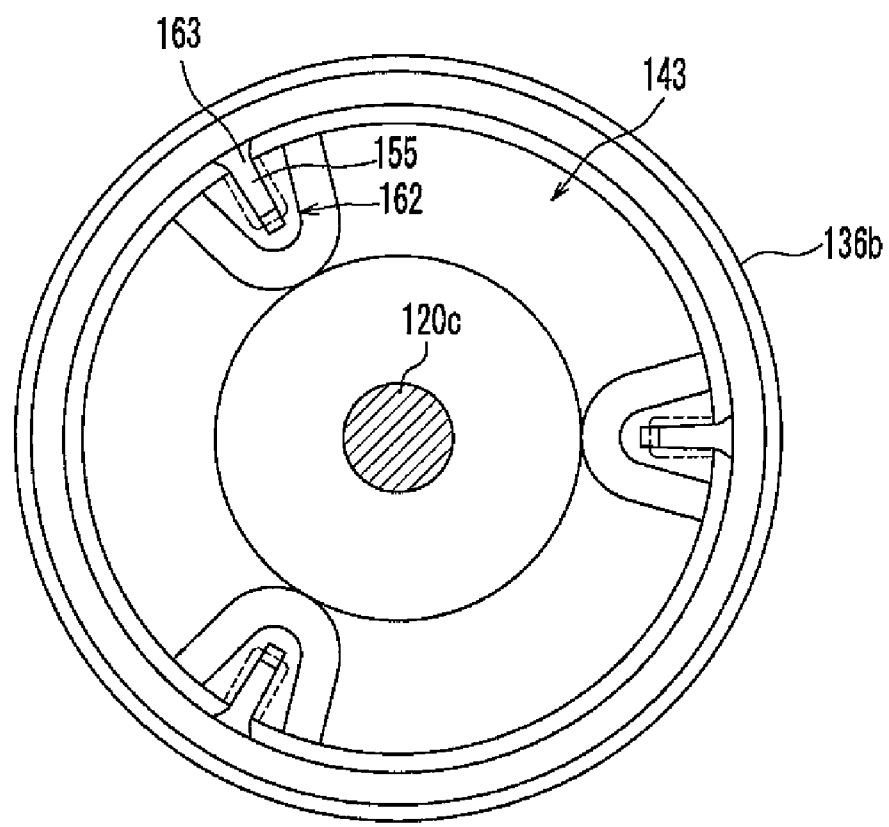
FIG. 15 is a plan view of the primary sheave in the related art according to Japanese Patent No. 008,214 as viewed from a cam plate.

According to the related art structure, slider attachment portions 160a of cam plate 160 are formed by deep drawing such that the slider extending direction crosses the axial direction (shifting direction) at right angles as illustrated in FIG. 14 (see also FIGS. 12(b) and 12(d)), expecting smooth movement of cam plate 160 in this structure. The present inventors found that arrangement of the slider extending direction orthogonal to the axial direction does not greatly relate to smooth movement of the slider, and thus developed this invention.

Figure 1:
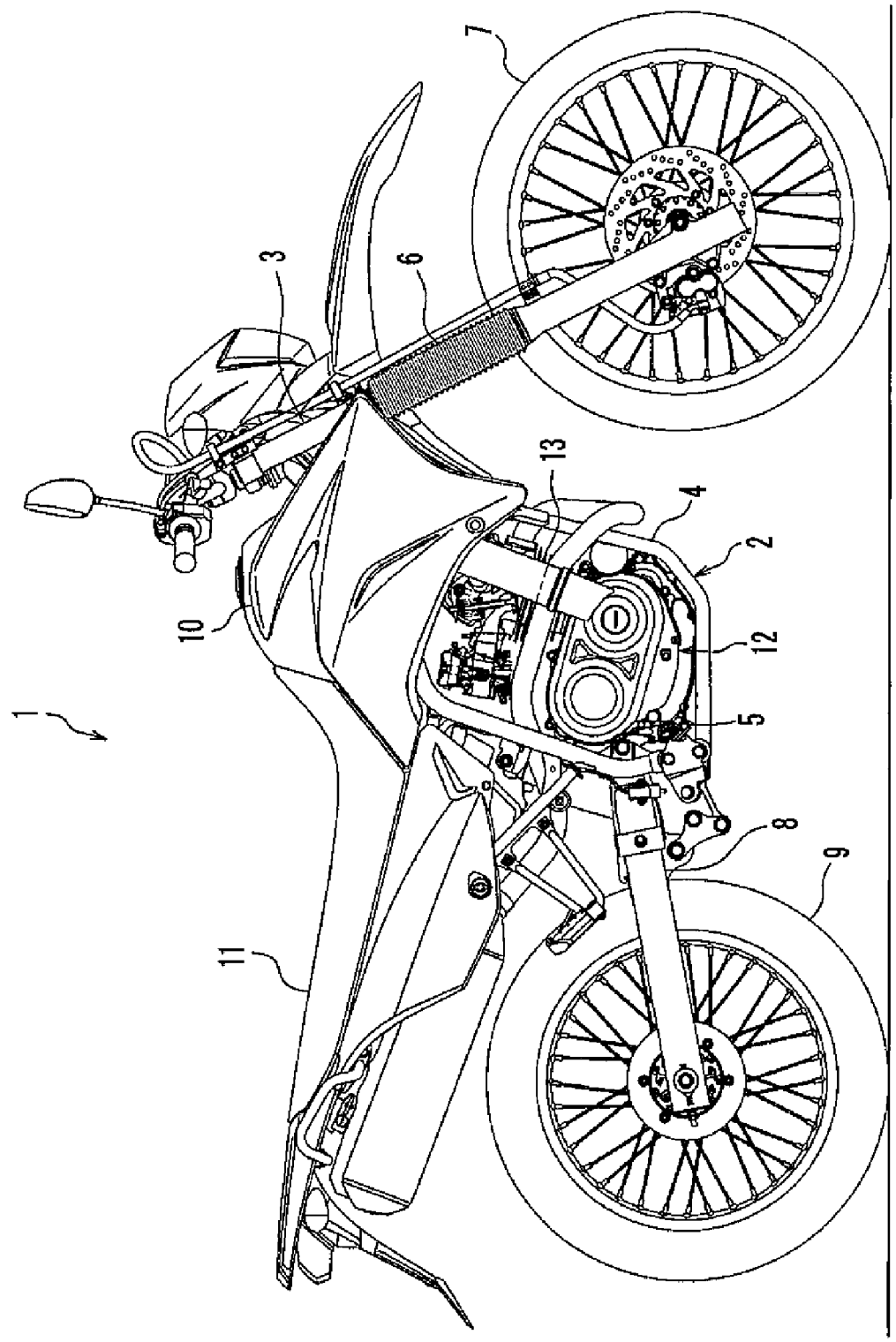
FIG. 1 is a side view of a motorcycle according to the invention.

An embodiment of the invention is described in detail with reference to the drawings. In this embodiment, an off-road type motorcycle 1 shown in FIG. 1 is discussed as an example of a straddle-type vehicle to which the invention has been applied. However, the straddle-type vehicle according to the invention is not limited to this type of motorcycle, and may be a motorcycle of types, such as a motorcycle type, a motor-scooter type, a so-called moped type and other types of motorcycles. The invention is also applicable to straddle-type vehicles other than motorcycles, such as all terrain vehicles (ATVs).

[General Structure of Motorcycle 1]

The general structure of motorcycle 1 is described with reference to FIG. 1. The terms "front", "rear", "left" and "right" in the following description refer to the front, rear, left and right directions from the perspective of a rider sitting on a seat 11.

Motorcycle 1 has a body frame 2. Body frame 2 has a head pipe 3, a down tube 4 extending downward from head pipe 3, and a seat pillar 5 extending from head pipe 3 toward the rear. The lower end of head pipe 3 is connected with a front wheel 7 via a front fork 6 and other components. A rear arm 8 extending toward the rear is supported in the vicinity of the lower end of seat pillar 5. The rear end of rear arm 8 is connected with a rear wheel 9. A cover 10 covers body frame 2, and seat 11 is shifted slightly toward the rear from the center of cover 10.

Figure 2:
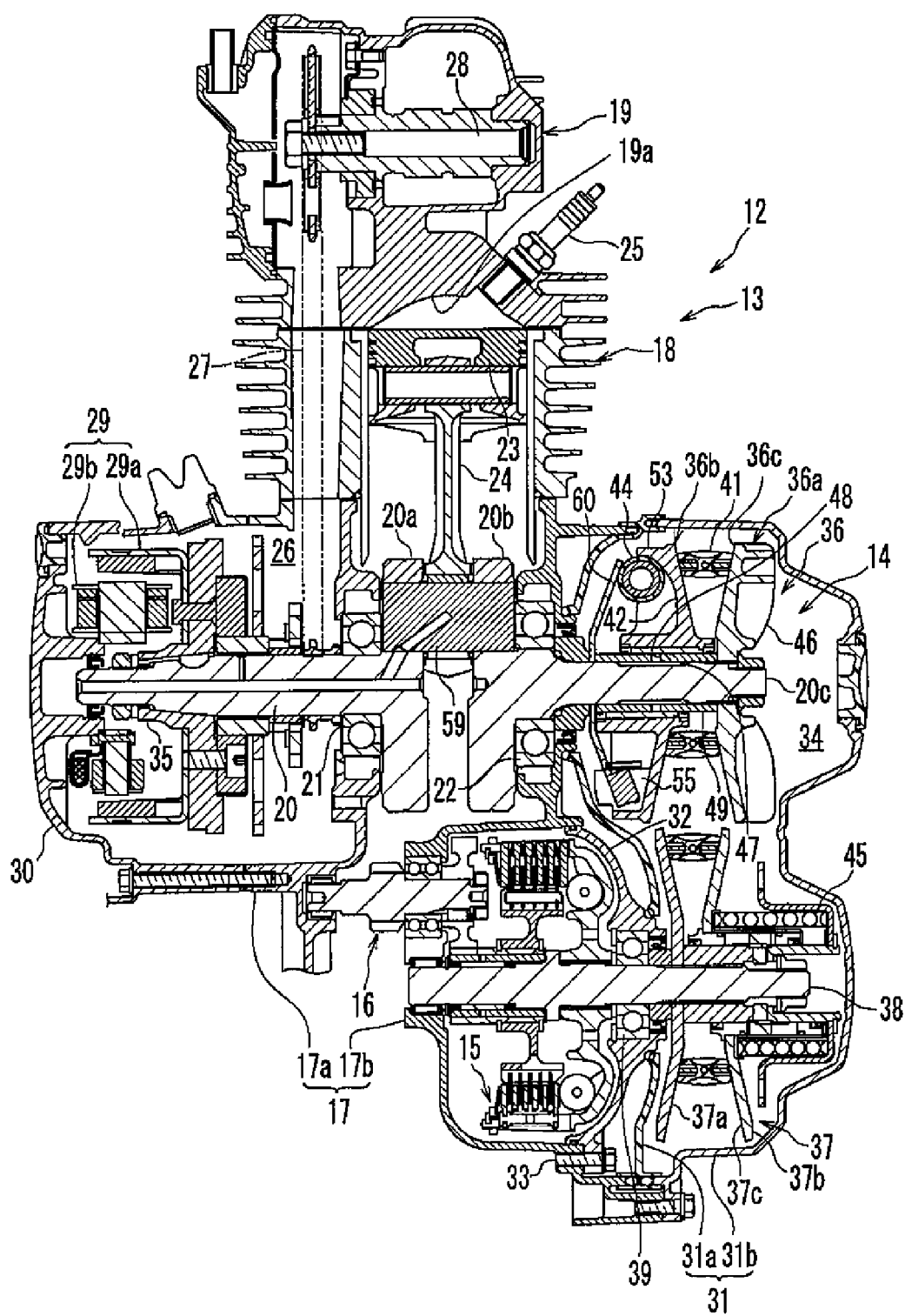
FIG. 2 is a cross-sectional view of an engine unit according to the invention.

An engine unit 12 is disposed between and supported by down tube 4 and seat pillar 5. As illustrated in FIG. 2, engine unit 12 is formed by combining an engine 13, a belt-type continuously variable transmission (CVT) 14, a reduction mechanism 16, and other components into one piece. Driving force generated by engine unit 12 is transmitted to rear wheel 9 via power transmitting means such as a chain belt. While engine 13 is a four-stroke single-cylinder engine in this example, engine 13 may be another type of engine such as a two-stroke engine or a multi-cylinder engine.

[Structure of Engine Unit 12]

The structure of engine unit 12 is now explained with reference to FIG. 2. Engine unit 12 has engine 13, CVT 14, a centrifugal clutch 15, and reduction mechanism 16. A part of the structure of reduction mechanism 16 is not shown in FIG. 2 in order to simplify the explanation.

Engine 13 has a crank case 17, a substantially cylindrical cylinder 18 and a cylinder head 19. Crank case 17 has a first case block 17a positioned on the left side and a second case block 17b on the right side. First and second case blocks 17a and 17b face each other in a vehicle width direction. Cylinder 18 is connected to a diagonally upper front portion of crank case 17. Cylinder head 19 is connected with the end of cylinder 18.

A crank shaft 20 horizontally extending in the vehicle width direction is accommodated in crank case 17. Crank shaft 20 is supported by first and second case blocks 17a and 17b via bearings 21 and 22.

A piston 23 is inserted into and slidable in cylinder 18. One end of a connecting rod 24 is connected with piston 23 on the crank shaft 20 side. The other end of connecting rod 24 is connected with a crank pin 59 disposed between a left crank arm 20a and a right crank arm 20b of crank shaft 20. Piston 23 can thereby reciprocate within cylinder 18 in accordance with rotation of crank shaft 20.

Cylinder head 19 has a concave 19a connecting with the inside space of cylinder 18, and intake and exhaust ports communicating with concave 19a. An ignition plug 25 is inserted into cylinder head 19 and fixed thereto such that an ignition area at the tip of ignition plug 25 is exposed in concave 19a.

A cam chain chamber 26 connecting the interior of crank case 17 and the interior of cylinder head 19 is provided inside the left part of cylinder 18. A timing chain 27 is disposed inside cam chain chamber 26. Timing chain 27 is wound around crank shaft 20 and cam shaft 28. This structure allows cam shaft 28 to rotate in accordance with rotation of crank shaft 20 so as to open and close the intake and exhaust valves.

A dynamo case 30 accommodating a dynamo 29 is detachably attached to the left side of the front half of first case block 17a. A transmission case 31 accommodating CVT 14 is attached to the right side of second case block 17b. An opening formed on the right side of the rear half of second case block 17b is closed by a clutch cover 32 detachably fixed to second case block 17b by a bolt 33.

Transmission case 31 is provided separately from crank case 17 and has an inside case 31a covering the inside (left side) of CVT 14 in the vehicle width direction, and an outside case 31b covering the outside (right side) of CVT 14 in the vehicle width direction. Inside case 31a is attached to the right side of crank case 17. Outside case 31b is attached to the right side of inside case 31a. A belt chamber 34 is sectioned by outside case 31b and inside case 31a.

The left end of crank shaft 20 penetrates through first case block 17a and reaches the inside of dynamo case 30. Dynamo 29 is attached to the left end of crank shaft 20 and has a rotor 29a opposed to a stator 29b. Stator 29b is fixed to dynamo case 30 in a manner to prevent rotation and shift of stator 29b. Rotor 29a is fixed to a sleeve 35 rotating with crank shaft 20 in a manner to prevent rotation of rotor 29a. This structure allows rotor 29a to rotate relative to stator 29b in accordance with rotation of crank shaft 20 for power generation.

CVT 14 is accommodated in belt chamber 34 and has a secondary sheave 37 disposed behind a primary sheave 36. Crank shaft 20 penetrates second case block 17b and inside case 31a and reaches belt chamber 34. The right part of crank shaft 20 (the right part from bearing 22) constitutes a primary sheave shaft 20c that supports primary sheave 36. Primary sheave 36 rotates with rotation of crank shaft 20.

A secondary sheave shaft 38 penetrating inside case 31a and clutch cover 32 and reaching the inside of crank case 17 is disposed in the rear half of transmission case 31. Secondary sheave shaft 38 is attached to clutch cover 32 via a bearing 39. Secondary sheave 37 is supported by secondary sheave shaft 38 within belt chamber 34.

A belt 41 (such as a resin block V belt) is wound around secondary sheave 37 and primary sheave 36. When primary sheave 36 rotates with crank shaft 20, the torque generated is transmitted to secondary sheave 37 via belt 41. Secondary sheave shaft 38 then rotates with secondary sheave 37. Rotation of secondary sheave shaft 38 is transmitted to rear wheel 9 via centrifugal clutch 15, reduction mechanism 16, and a power transmission means such as a belt and chain.

[Specific Structure of CVT 14]

The structure of CVT 14 is now explained in more detail with reference to FIG. 2. As discussed above, CVT 14 has primary sheave 36, secondary sheave 37, and belt 41, and is accommodated in belt chamber 34. Primary sheave 36 has a fixed sheave member 36a and a movable sheave member 36b, each of which has a tapered shape. Fixed sheave member 36a is fixed to the right end of primary sheave shaft 20c and extends in a radially outside direction while approaching the outside (right side) in the vehicle width direction. Fixed sheave member 36a rotates with primary sheave shaft 20c. Movable sheave member 36b is shifted toward the center (left side) from, and is opposed to, fixed sheave member 36a. Movable sheave member 36b extends in a radially outside direction while approaching the inside (left side) in the vehicle width direction. A boss formed at the rotation center of movable sheave member 36b is attached to primary sheave shaft 20c via a collar 49. Movable sheave member 36b engages with a cam plate 60 attached to primary sheave shaft 20c such that cam plate 60 cannot rotate, and rotation of movable sheave body 36b is regulated by cam plate 60. Thus, movable sheave member 36b can slide in the axial direction of primary sheave shaft 20c, but cannot rotate relative to primary sheave shaft 20c. A substantially V-shaped belt groove 36c around which belt 41 is wound is formed by fixed sheave member 36a and movable sheave member 36b. The width of belt groove 36c is varied by changing the position of movable sheave member 36b relative to fixed sheave member 36a.

A grease (lubricant) reservoir 47 is provided between primary sheave shaft 20c and collar 49. More specifically, the radius of primary sheave shaft 20c is about 2 mm shorter than those of other components, and the clearance thus produced between primary sheave shaft 20c and collar 49 constitutes grease reservoir 47. One or plural holes 48 through which grease reservoir 47 communicates with the outside are formed on collar 49. Holes 48 allow grease in grease reservoir 47 to be supplied to primary sheave 36 by centrifugal force generated in accordance with rotation of primary sheave 36. A large quantity of grease is supplied during high-speed rotation to effectively prevent seizure of components with one another and abrasion of primary movable sheave 36b, collar 49 and other components. The size and number of holes 48 is appropriately determined based on the grease supply amount.

The forming method of grease reservoir 47 is not specifically limited. For example, grease reservoir 47 may be formed by boring collar 49 (gouging the inner periphery of collar 49) to expand the inside diameter of collar 49. Alternatively, grease reservoir 47 may be created by forming linear grooves extending in the axial direction on primary sheave shaft 20c. When grease reservoir 47 is produced by forming linear grooves, supply of grease to grease reservoir 47 is easier than when grease reservoir 47 is produced by narrowing a part of primary sheave shaft 20c to have a radius shorter than those of other components. More specifically, when grease reservoir 47 is formed by narrowing a part of primary sheave shaft 20c, collar 49 attached after grease is applied to grease reservoir 47 may contact the applied grease at the time of attachment of collar 49. In this case, grease may come out of grease reservoir 47. However, when grease reservoir 47 is produced by forming linear grooves, collar 49 attached after grease is applied to grease reservoir 47 does not contact the applied grease at the time of attachment of collar 49. Thus, grease does not come out of grease reservoir 47. When grease reservoir 47 is formed by narrowing a part of primary sheave shaft 20c, grease may be injected through holes 48.

A cooling fan 46 is provided on the outer surface (right surface in FIG. 2) of fixed sheave member 36a. A plurality of cam surfaces 42 extending in the radial direction are provided on the left surface of movable sheave member 36b. Cam plate 60 is disposed on the left side of movable sheave member 36b at a position opposed to cam surfaces 42. A plurality of substantially cylindrical (or substantially column-shaped) roller weights (pressing members) 44 which cannot shift in a circumferential direction and can shift in the radial direction are provided in a space sectioned between cam plate 60 and cam surfaces 42. Cam surfaces 42 are tapered in a manner to radially extend from the center toward the outside while approaching cam plate 60. Cam plate 60 is similarly tapered to radially extend from the center toward the outside while approaching cam surfaces 42. Thus, the distance between cam plate 60 and cam surfaces 42 decreases toward the outside in the radial direction.

Secondary sheave 37 has a fixed sheave member 37a and a movable sheave member 37b positioned outside and opposed to fixed sheave member 37a in the vehicle width direction. Fixed sheave member 37a is fixed to secondary sheave shaft 38 and radially extends toward the outside while approaching the inside (left side) in the vehicle width direction. Fixed sheave member 37a rotates with secondary sheave member 38. Movable sheave member 37b is fixed to secondary sheave shaft 38 and radially extends toward the outside while approaching the outside (right side) in the vehicle width direction. Movable sheave member 37b cannot rotate relative to secondary sheave shaft 38 and can slide in the axial direction. A substantially V-shaped belt groove 37c around which belt 41 is wound is formed by fixed sheave member 37a and movable sheave member 37b. The width of belt groove 37c is varied by changing the position of movable sheave member 37b relative to the position of fixed sheave member 37a. The shaft center of movable sheave member 37b is constituted by a cylindrical slide collar, and engages with secondary sheave shaft 38 by spline engagement.

A compressing coil spring 45 is disposed on the outside (right side) of movable sheave member 37b in the vehicle width direction. Compressing coil spring 45 urges movable sheave member 37b toward fixed sheave member 37a. This structure allows the width of belt groove 37c to be a minimum at a time of low speed revolution of the engine, such as under the idling condition.

CVT 14 determines a speed change ratio based on the ratio of the force of roller weights 44 for pressing primary movable sheave member 36b toward primary fixed sheave member 36a (toward the right) to the force of compressing coil spring 45 for urging secondary movable sheave member 37b toward secondary fixed sheave member 37a (toward the left).

More specifically, when the rotation speed of primary sheave shaft 20c is low, the width of belt groove 37c of secondary sheave 37 is reduced by the urging force of compressing coil spring 45 (see the condition of secondary sheave 37 shown above secondary sheave shaft 38 (maximum speed change ratio position) in FIG. 2). In this condition, the belt winding diameter of secondary sheave 37 increases, and belt 41 is pulled toward secondary sheave 37. Thus, primary movable sheave member 36b is pressed toward cam plate 60 by belt 41, and the width of belt groove 36c of primary sheave 36 expands (see the condition of primary sheave 36 shown below primary sheave shaft 20c (maximum speed change ratio condition) in FIG. 2). As a result, the speed change ratio increases.

On the other hand, when the rotation speed of primary sheave shaft 20c is high, centrifugal force causes roller weights 44 to shift toward the outside in the radial direction. Since the distance between primary movable sheave member 36b and cam plate 60 is narrowed toward the radially outside, primary sheave member 36b is pressed toward primary fixed sheave member 36a (toward the right) by the shift of roller weights 44 to the outside in the radial direction. Then, primary movable sheave member 36b slides toward primary fixed sheave member 36a, and the width of belt groove 36c decreases (see the condition of primary sheave 36 shown above primary sheave shaft 20c (minimum speed change ratio position) in FIG. 2). In this condition, the belt winding diameter of primary sheave 36 increases, and belt 41 is pulled toward primary sheave 36. Thus, belt 41 presses secondary movable sheave member 37b in a direction away from secondary fixed sheave member 37a (to the right) against the urging force of compressing coil spring 45. As a result, secondary movable sheave member 37b slides in a direction away from secondary fixed sheave member 37a, and the belt winding diameter of secondary sheave 37 decreases (see the condition of secondary sheave 37 shown below secondary sheave shaft 38 (minimum speed change ratio condition) in FIG. 2). As a result, the speed change ratio decreases.

The materials of primary fixed sheave member 36a, primary movable sheave member 36b, secondary fixed sheave member 37a, secondary movable sheave member 37b, and cam plate 60 are not specifically limited. For example, these materials may be metals such as iron, aluminum, and stainless steel. The surfaces of these components may be processed by chrome plating or other processing.

Roller weights 44 change the distance between cam surfaces 42 and cam plate 60 by shifting in the radially inside to outside direction, and thus may be of any type as long as they can shift in the radially inside to outside direction. For example, roller weights 44 may be spherical, straw-bag-shaped or have other shapes. Also, roller weights 44 may shift while rotating, or just slide.

[Structure of Primary Sheave 36]

The structure of primary sheave 36 and, more specifically, the structures of primary sheave member 36b and cam plate 60, are now described in detail with reference to FIGS. 3-12.

<Structure of Primary Movable Sheave Member 36b>

Figure 4:
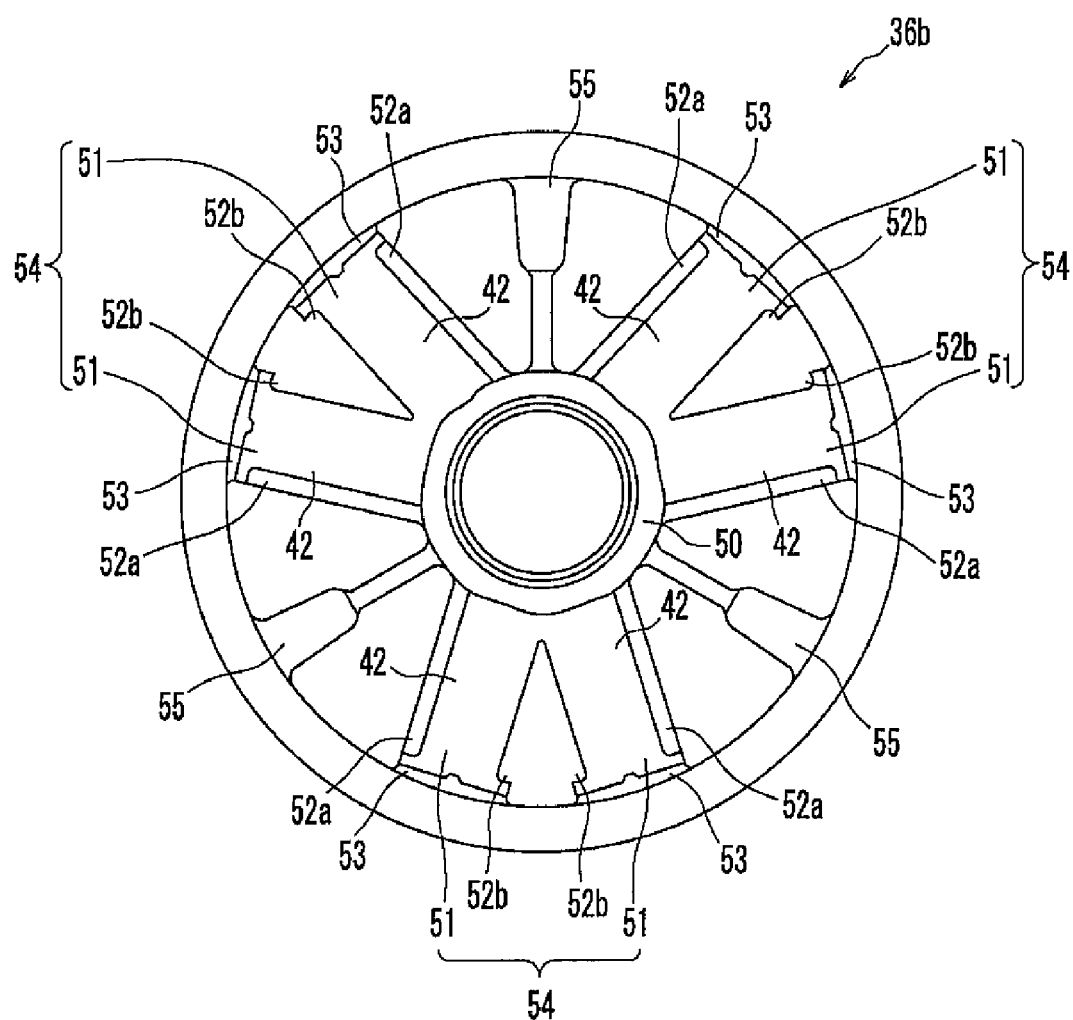
FIG. 4 is a plan view of the primary sheave member as viewed from the center in a vehicle width direction according to the invention.

Initially, the structure of primary movable sheave member 36b is explained with reference to FIG. 4. A plurality of guide grooves 51 on which roller weights 44 are disposed is formed on the back surface of primary movable sheave member 36b. More specifically, six guide grooves 51 radially extend from a boss 50 toward the outside in the radial direction. The six guide grooves 51 are disposed in three pairs 54, each forming a V shape, at substantially equal intervals around boss 50.

Each guide groove 51 has a cam surface 42 and a pair of guide walls 52a and 52b. As illustrated in FIG. 2, cam surface 42 radially extends toward the outside while inclined toward cam plate 60. Guide walls 52a and 52b project from end sides of cam surface 42 and face each other in parallel, and radially extend along the end sides of cam surface 42. The distance between guide walls 52a and 52b is substantially the same as the height of roller weight 44, and roller weight 44 moves in guide groove 51 along guide walls 52a and 52b in the radial direction of primary movable sheave member 36b.

A stopper 53 projecting from cam surface 42 toward cam plate 60 is provided on the outer end of each guide groove 51 in the radial direction (see FIG. 2 as well). Stopper 53 determines the radially outer end of the movable area of roller weight 44. Thus, stopper 53 regulates further shift of roller weight 44 toward the radially outside by contacting the outer circumferential surface of roller weight 44 when primary sheave member 36b reaches a minimum speed change ratio position where primary movable sheave member 36b reduces the width of belt groove 36c to a minimum.

Guide ribs (guide members) 55 are disposed between guide groove pairs 54 and project from the surface of primary movable sheave member 36b on the cam plate side toward cam plate 60 in the axial direction (vertical direction with respect to the sheet surface of FIG. 4), and are provided at equal intervals in the circumferential direction of primary movable sheave member 36b. Each guide rib 55 extends from the outer circumference of the cam plate side surface of primary movable sheave member 36b toward the inside in the radial direction. Guide ribs 55 engage guide grooves 63 of cam plate 60 as will be described later such that guide ribs 55 can slide therein. Primary movable sheave member 36b is guided in the axial direction by the sliding of guide ribs 55 in guide grooves 63.

[Structure of Cam Plate 60]

Figure 3:
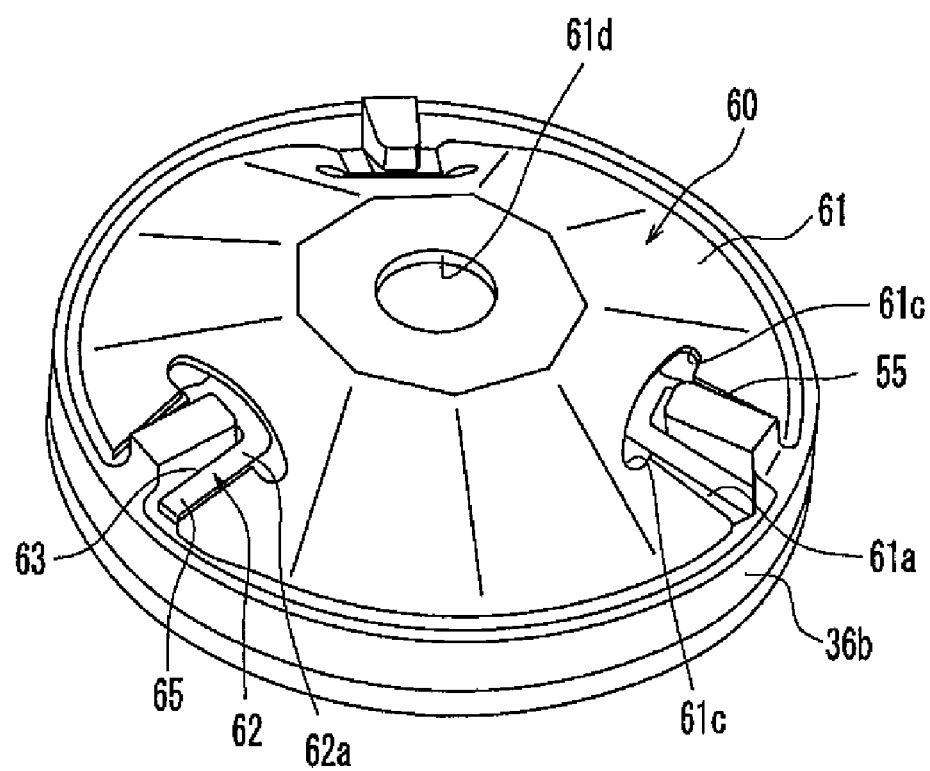
FIG. 3 is a plan view of a primary movable sheave member to which a cam plate is attached as viewed from the center in a vehicle width direction according to the invention.
Figure 5:
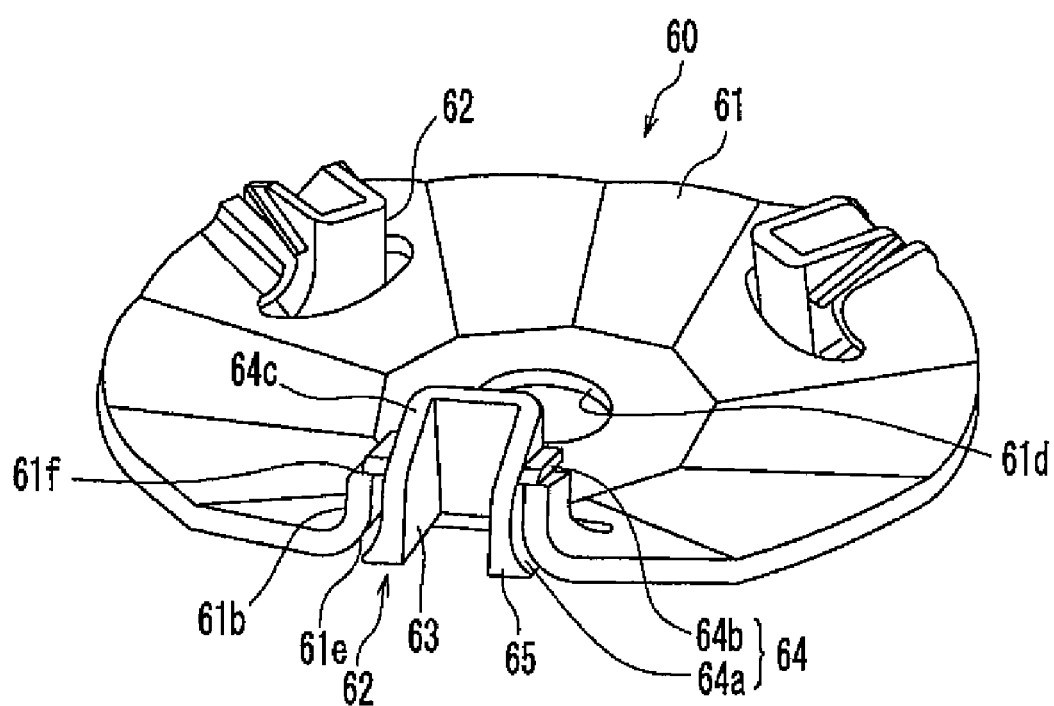
FIG. 5 is a plan view of a plate main body as viewed from the primary movable sheave member according to the invention.
Figure 6:
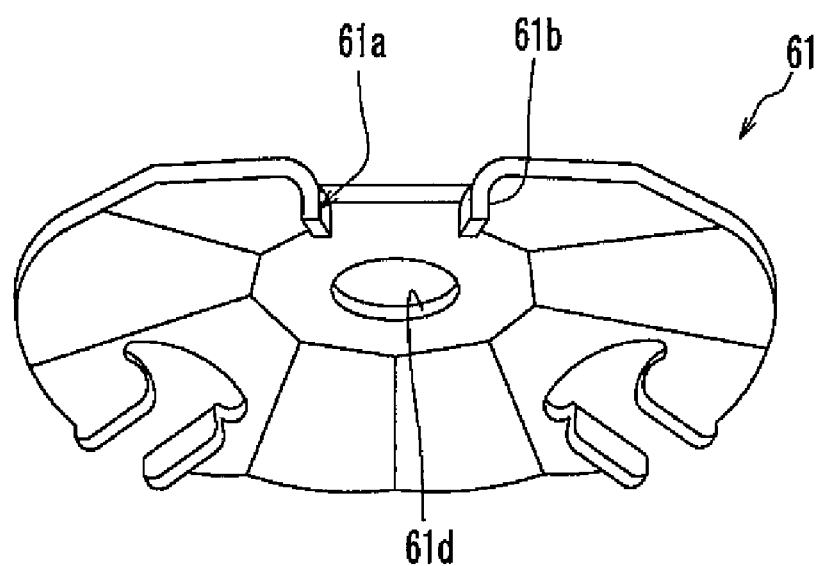
FIG. 6 is a perspective view of the plate main body according to the invention.
Figure 7:
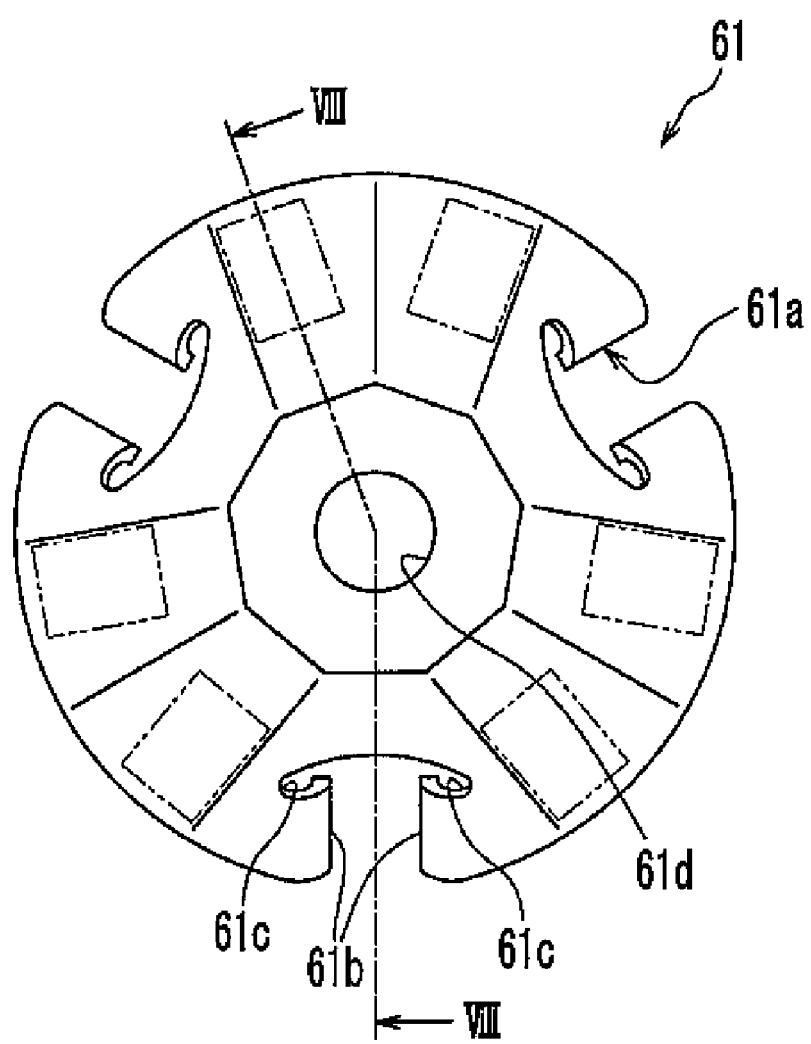
FIG. 7 is a plan view of the plate main body according to the invention.
Figure 8:
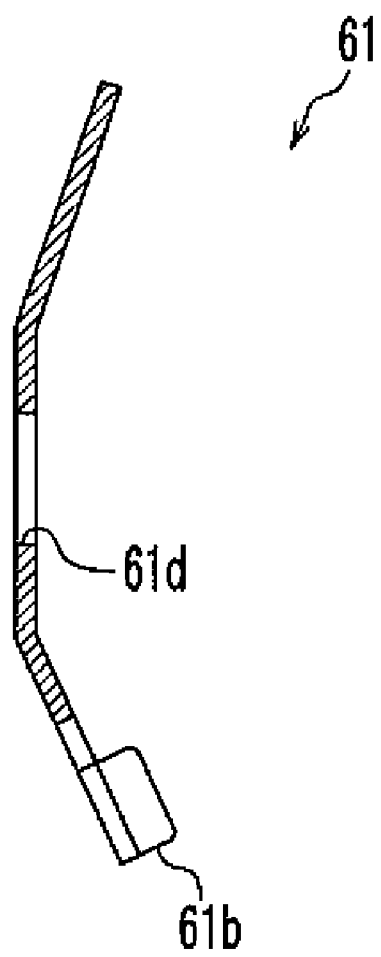
FIG. 8 is a cross-sectional view taken through line VIII-VIII of FIG. 7.

As illustrated in FIGS. 3 and 5, cam plate 60 has a plate main body 61 made of metal (such as iron), and a plurality of sliders (slide members) 62 made of resin (such as 4-6 nylon) or other materials. More specifically, sliders 62 are provided at equal intervals along the outer circumferential portion of the substantially circular plate main body 61 in plan view.

An open hole 61d through which primary sheave shaft 20c is inserted is formed at the center of plate main body 61. Plate main body 61 has a tapered shape expanding from the center where open hole 61d is formed toward primary movable sheave member 36b (see also FIGS. 2 and 6-8). Notches 61a are formed on plate main body 61 at positions corresponding to guide ribs 55. More specifically, three substantially rectangular notches 61a in plan view are formed on the outer circumferential portion of plate main body 61 at equal intervals. For the areas where notches 61a are formed, deep drawing is not performed. In other words, notches 61a are substantially leveled with other portions of plate main body 61, and walls projecting in the axial direction are not provided radially inside notches 61a.

Figure 10:
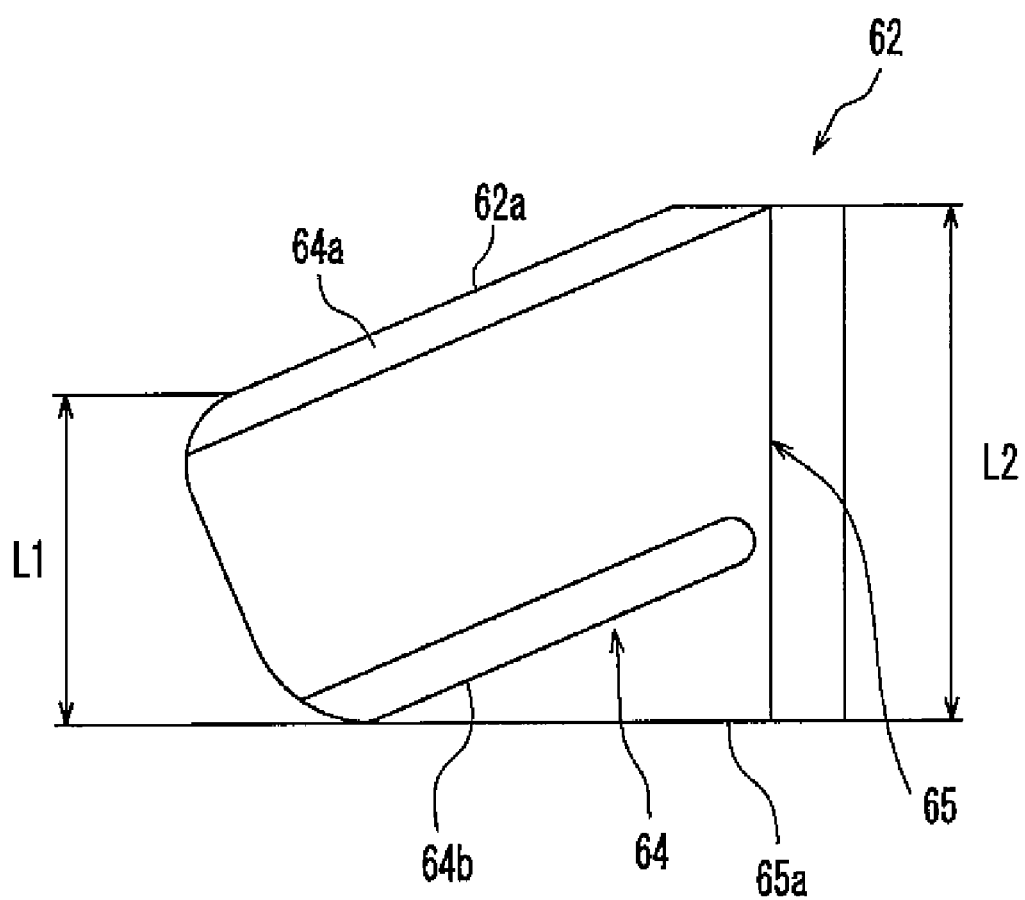
FIG. 10 is a side view of the slider according to the invention.

As illustrated in FIG. 5, sliders 62 are disposed in notches 61a. As discussed above, deep drawing is not performed for notches 61a to which sliders 62 are attached. Thus, as illustrated in FIGS. 3 and 10, the radially outside portions of inside end surfaces 62a of sliders 62 in the vehicle width direction are positioned outside the radially inside portions thereof in the vehicle width direction. More specifically, surfaces 62a are formed on inclined surfaces extending toward the outside in the radial direction while inclined toward the outside in the vehicle width direction.

A guide groove (sliding groove) 63 is formed on each slider 62. Guide ribs 55 engage guide grooves 63 such that guide ribs 55 can slide therein, and thus prevent rotation of cam plate 60 relative to primary movable sheave member 36b. Since primary movable sheave member 36b is attached to primary sheave shaft 20c such that primary movable sheave member 36b cannot rotate as discussed above, cam plate 60 rotates with primary movable sheave member 36b by rotation of primary sheave shaft 20c. Cam plate 60 is attached to primary sheave shaft 20c such that cam plate 60 cannot shift in the axial direction of primary sheave member 20c. Thus, the position of cam plate 60 relative to primary fixed sheave member 36a cannot be varied in the axial direction, but the position of cam plate 60 relative to primary movable sheave member 36b can be varied in the axial direction.

Notches 61c extending in the circumferential direction are formed at both radially inside corners of each notch 61a. The ends of each notch 61a extending inside to outside in the radial direction are bended toward primary movable sheave member 36b in the axial direction. Bended portions 61b allow sliders 62 to be attached to plate main body 61 such that sliders 62 cannot move in the axial direction.

Figure 9:
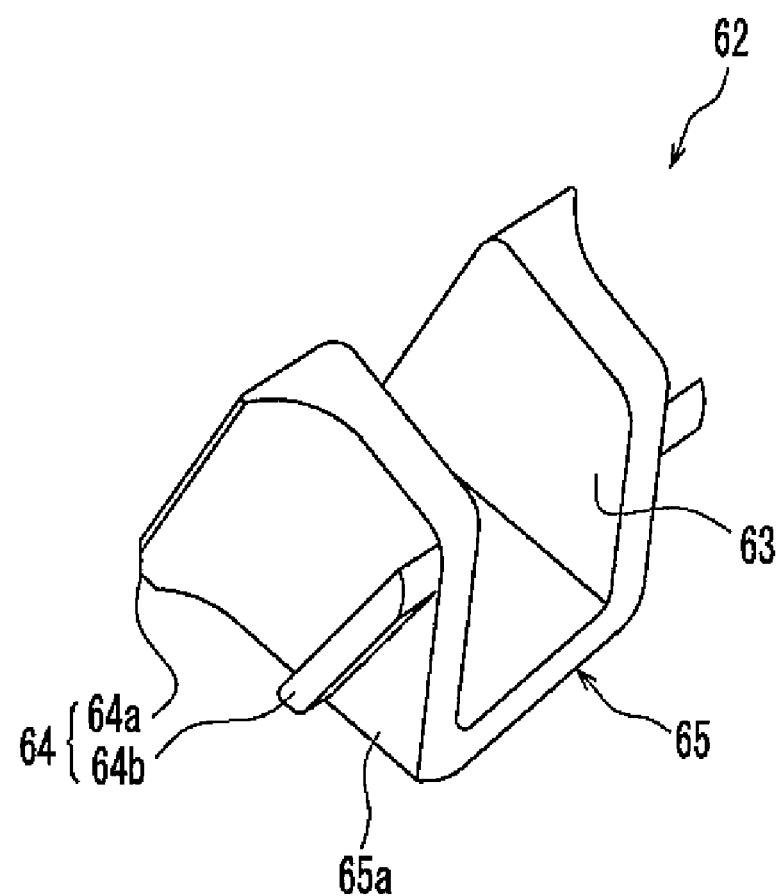
FIG. 9 is a perspective view of a slider according to the invention.
Figure 11:
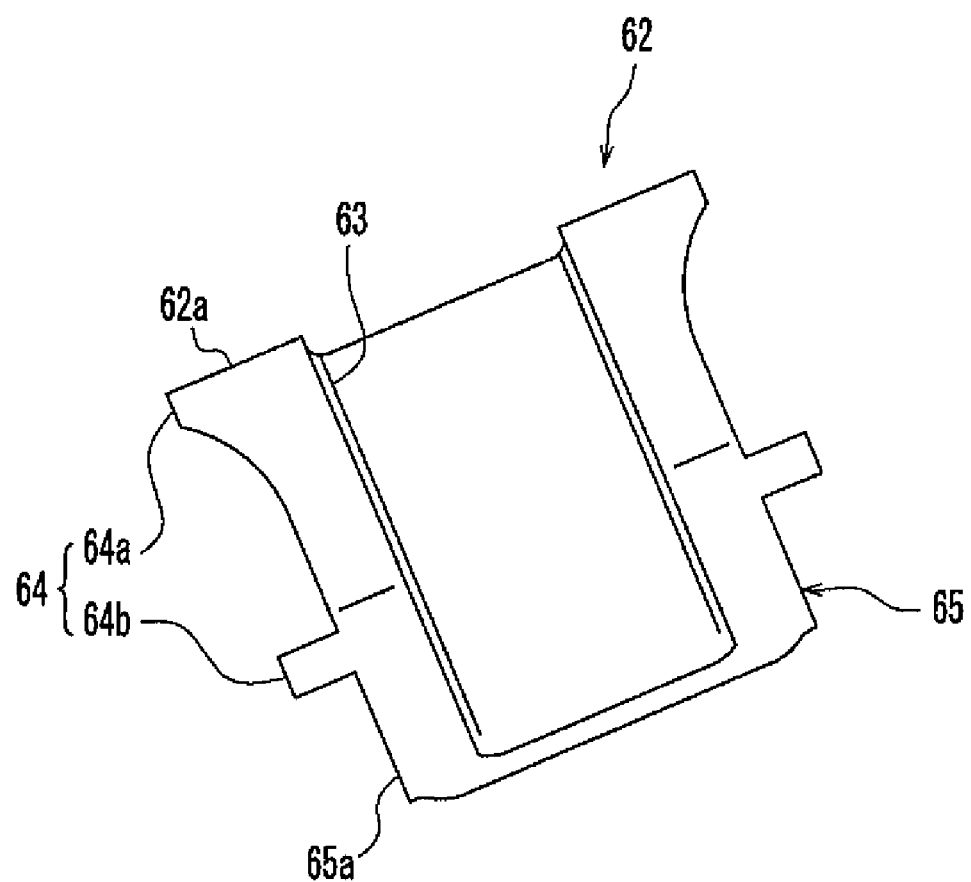
FIG. 11 is a front view of the slider according to the invention.

More specifically, as illustrated in FIGS. 9-11, each slider 62 has a slider main body 65 having guide groove 63 and an engaging portion 64 formed on an outer surface of slider main body 65. Engagement between engaging portion 64 and bended portion 61b regulates the position change of slider 62 relative to plate main body 61 in the axial direction.

More specifically, each engaging portion 64 has a first linear convex 64a and a second linear convex 64b extending along plate main body 61 in a direction in parallel with the extending direction of plate main body 61 and inclined to the axial direction. First linear convex 64a is provided at one end of the outer surface of slider main body 65 along the end side. The side surface of first linear convex 64a on the primary movable sheave member 36b side has a curved surface corresponding to the shape of a bend 61e of bended portion 61b, and contacts bend 61e by surface contact. The side surface of first linear convex 64a on the side opposite to primary movable sheave member 36b is leveled with the end surface of slider main body 65. Thus, end surface 62a of slider 62 is substantially leveled with the tapered surface of plate main body 61 on the side opposite to primary movable sheave member 36b. Guide grooves 63 extend from the area where guide grooves 63 are substantially leveled with the tapered surface of plate main body 61 on the side opposite to primary movable sheave member 36b toward primary movable sheave member 36b.

Second linear convex 64b is located at a position slightly shifted to the other end of the outer surface of slider main body 65 from the center thereof. The side surface of second linear convex 64b on the side opposite to primary movable sheave member 36b contacts an end surface 61f of bended portion 61b. First linear convex 64a and second linear convex 64b are preferably disposed in parallel with each other to ease attachment and detachment of slider 62.

As illustrated in FIG. 10, slider 62 has a substantially trapezoidal shape in side view having an axial length L1 of the radially outside portion of slider 62 smaller than an axial length L2 of the radially inside portion of slider 62. In other words, the radially inside area of slider main body 65 further extends from the portion where second linear convex 64b is provided toward primary movable sheave member 36b. Thus, an extension 65a which extends from a position shifted toward primary movable sheave member 36b from second linear convex 64b is formed on slider main body 65.

[Operation and Advantage]

Since the radially outside portion of end surface 62a of slider 62 is positioned outside the radially inside portion thereof in the vehicle width direction, the length of the engaging portion between cam plate 60 and guide rib 55 in the extending direction of cam plate 60 is relatively large. More specifically, since end surface 62a of slider 62 is an inclined surface extending toward the outside in the radial direction while inclined toward the outside in the vehicle width direction, the length of the engaging portion between cam plate 60 and guide rib 55 in the extending direction of the plate 60 is relatively large.

Figure 12:
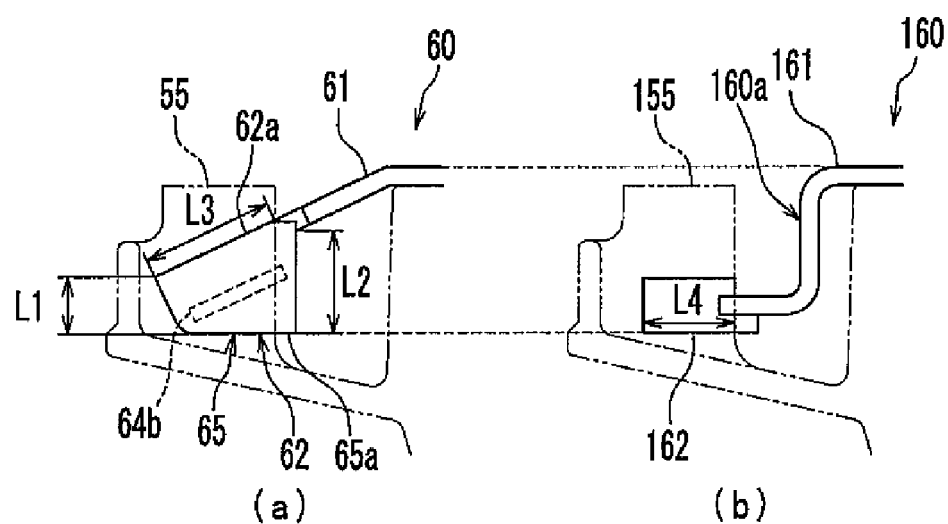
FIG. 12(a) schematically illustrates an engagement between a cam plate and a guide rib according to the invention when a width of a guide groove is a maximum.
FIG. 12(b) schematically illustrates an engagement between a cam plate and a guide rib in related art when a width of the guide groove is a maximum.
FIG. 12(c) schematically illustrates an engagement between a cam plate and a guide rib according to the invention when a width of the guide groove is a minimum.
FIG. 12(d) schematically illustrates an engagement between a cam plate and a guide rib in related art when a width of the guide groove is a minimum.
Figure 12:
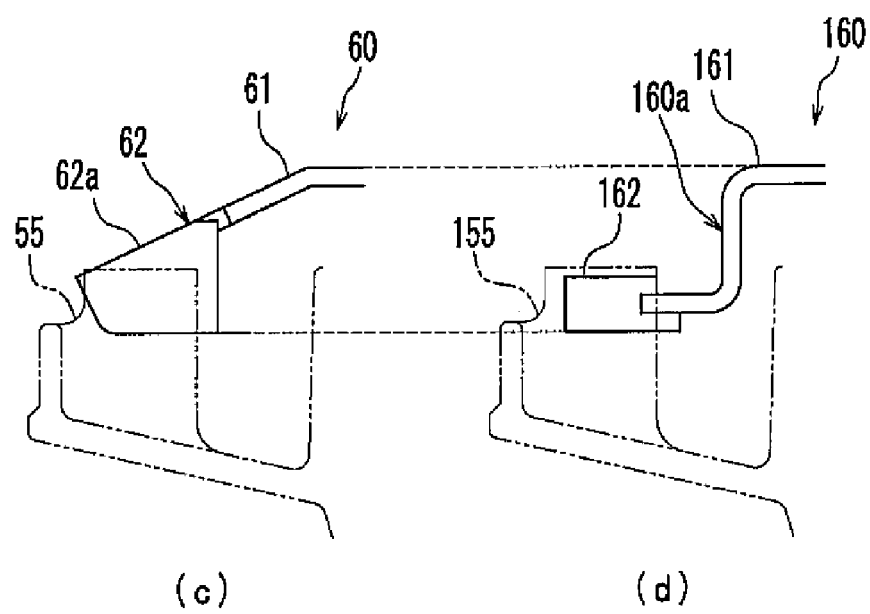

More specifically, as illustrated in FIG. 12(*a*), end surface 62*a* is tapered according to this embodiment, and therefore a length L3 of the engaging portion between cam plate 60 and guide rib 55 in the extending direction of cam plate 60 is larger than a corresponding length L4 in the related-art structure (FIG. 12(*b*)) where the portion processed by deep drawing for attachment of slider 162 of plate main body 161 crosses the axial direction at right angles. Accordingly, guide groove 63 and guide rib 55 engage more rigidly with each other, and primary movable sheave member 36*b* more smoothly and stably slides relative to cam plate 60.

Since the radially outside portion of end surface 62*a* of slider 62 is positioned outside the radially inside portion of end surface 62*a* in the vehicle width direction, the need for deep drawing of plate main body 61 is eliminated. Thus, cost is lowered, and the necessity for complicated and difficult deep drawing for plate main body 61 is eliminated. Accordingly, cam plate 60 can be manufactured more easily at lower cost than the cam plate having the related art structure which requires deep drawing. The life of a (metal) mold used for forming cam plate 60 is prolonged, and the cost for molding cam plate 60 is reduced. As a result, CVT 14 and motorcycle 1 are easily manufactured at low cost.

According to plate main body 161 of the related art for which deep drawing is performed, slider 162 must be attached at a position away from the boss by an amount corresponding to the deep drawing. This makes it difficult to increase the length of slider 162 in the radial direction sufficient to extend a further inside portion in the radial direction. According to the invention, by contrast, the length of slider 62 which does not require deep drawing is increased in the radial direction enough to reach a further inside portion in the radial direction. That is, since plate main body 61 does not require deep drawing, length L3 of the engaging portion between cam plate 60 and guide rib 55 in the extending direction of cam plate 60 is increased. Thus, guide groove 63 and guide rib 55 engage with each other more rigidly, and primary movable sheave member 36*b* slides more smoothly and stably relative to cam plate 60. Moreover, since the contact area between slider 62 and guide rib 55 is relatively large, the surface pressure applied to slider 62 is relatively low. As a result, the durability of slider 62 made of a material having a relatively low hardness is increased.

According to this embodiment, guide groove 63 extends from its portion substantially leveled with the tapered surface of plate main body 61 toward primary movable sheave member 36*b*. Thus, a large contact area between guide groove 63 and guide rib 55 is secured, the engagement between guide groove 63 and guide rib 55 is especially rigid, and the sliding of primary movable sheave member 36*b* relative to cam plate 60 is considerably stabilized. Moreover, according to this structure, the contact area between slider 62 and guide rib 55 is particularly enlarged. Thus, the durability of slider 62 made of material having relatively low hardness is further improved.

Slider 62 is fixed to plate main body 61 by the engagement between engaging portion 64 and bended portion 61*b* formed by bending each end of notch 61*a* extending inside to outside in the radial direction. More specifically, slider 62 is attached to plate main body 61 by surface contact between the surface of bended portion 61*b* and the side of slider 62 under the condition where engaging portion 64 contacting bend 61*e* and end surface 61*f* pinches the bended portion in the axial direction. Thus, a large contact area between slider 62 and plate main body 61 is secured, and slider 62 is rigidly fixed to plate main body 61. In addition, the surface pressure of the contact surface between plate main body 61 and slider 62 is relatively low. Accordingly, the durability of slider 62 made of a material having a relatively low hardness such as resin is increased. To further improve the durability of slider 62, a protection member (such as metal) which contacts slider 62 with a contact area larger than the contact area between slider 62 and plate main body 61 may be interposed between slider 62 and plate main body 61.

According to the invention, guide groove 63 extends from its portion substantially leveled with the tapered surface of plate main body 61 toward primary movable sheave member 36*b*. Thus, as illustrated in FIG. 12(*c*), a sufficient engagement area between guide rib 55 and guide groove 63 is secured even when plate main body 61 shifts further upward from the radially inner end of guide rib 55 in FIG. 12(*c*) (more specifically, in a direction away from the surface of primary movable sheave member 36*b* opposed to cam plate 60). That is, since guide groove 63 extends from plate main body 61 toward primary movable sheave member 36*b* as illustrated in FIG. 12(*c*), a large shift range of primary movable sheave member 36*b* relative to cam plate 60, which range is equivalent to that of the related-art structure using deep drawing shown in FIG. 12(*d*), is secured.

Particularly, as illustrated in FIG. 12(*a*), the contact area between guide groove 63 and guide rib 55 under the condition where primary movable sheave member 36*b* is away from cam plate 60 is enlarged by forming slider main body 65 which has a substantially trapezoidal shape in side view with a length L2 of the radially inner portion in the axial direction longer than a length L1 of the radially outer portion thereof, that is, by forming extension 65*a* which extends from a position shifted toward primary movable sheave member 36*b* from second linear convex 64*b*. In this case, the length of guide rib 55 in the axial direction is relatively short, and a comparatively wide shift range of primary movable sheave member 36*b* relative to cam plate 60 in the axial direction is secured. Accordingly, primary sheave 36 can be made compact and thin. CVT 14 provided according to this embodiment can vary the speed ratio relatively largely.

According to this embodiment, engaging portion 64 is disposed along the end side of the outer side of slider main body 65 on the side opposite to primary movable sheave member 36*b* (FIG. 9). Thus, the upper end surface of slider 62 is substantially leveled with the tapered surface of cam plate 60. That is, slider 62 does not project toward the side opposite to primary movable sheave member 36*b* from the tapered surface of cam plate 60. Thus, as illustrated in FIG. 2, positional interference between inside case 31*a* of transmission case 31 and slider 62 is prevented. Accordingly, CVT 14 can be made further compact.

According to this embodiment, bends 61*e* are formed by bending the respective ends of notch 61*a* extending inside to outside in the radial direction, and first linear convex 64*a* is provided such that the side of first linear convex 64*a* on primary movable sheave member 36*b* side has a curved surface corresponding to the shape of bend 61*e* of bended portion 61*b*. Thus, projection of slider 62 toward the side opposite to primary movable sheave member 36*b* with respect to the axial direction from the tapered surface of cam plate 60 is effectively prevented. This is particularly advantageous in view of reducing the size of CVT 14.

OTHER EMBODIMENTS

The following modifications and changes may be made to the embodiment of the invention described above. Plate main body 61 and slider (slide member) 62 may be formed integrally with each other. However, when the shape of slider 62 is particularly complicated, plate main body 61 and slider 62 are preferably separate from each other to ease manufacture.

According to this embodiment, primary sheave 36 has primary fixed sheave member 36*a* and primary movable sheave member 36*b*. However, primary sheave 36 may have two primary movable sheave members opposed to each other. More specifically, an additional cam plate and pressing member may be provided on the right side of primary fixed sheave member 36*a* such that primary fixed sheave member 36*a* can be shifted in the axial direction of primary sheave shaft 20*c* in accordance with the shift of the pressing member.

Figure 13:
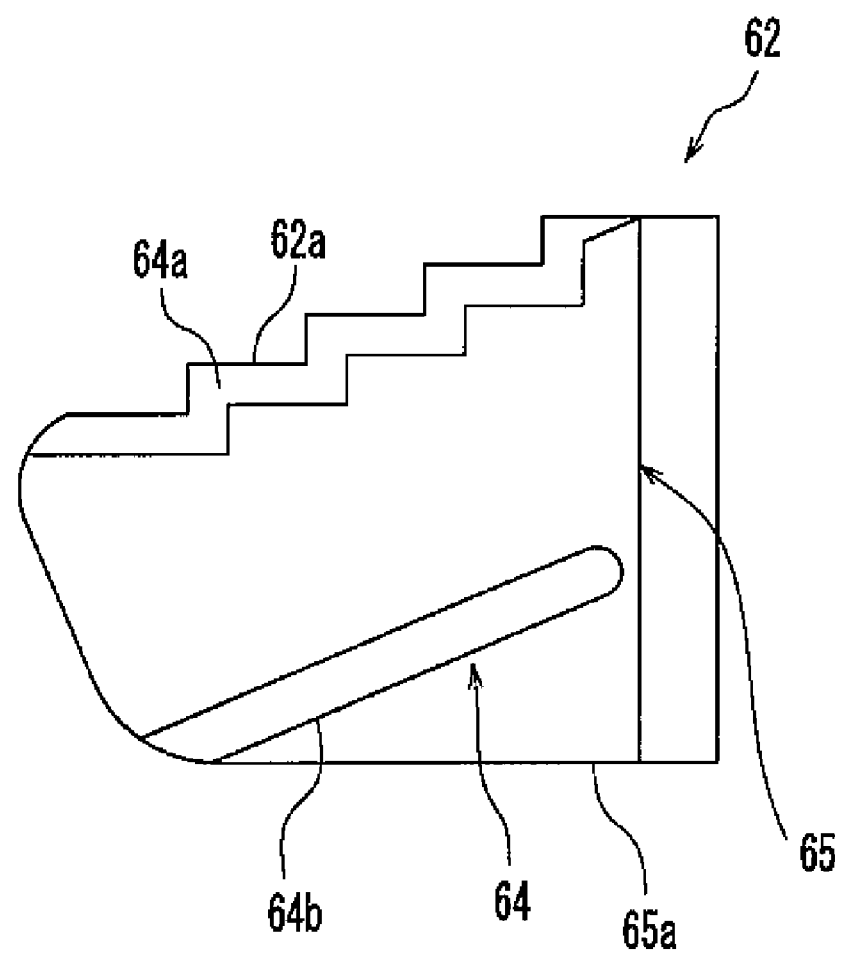
FIG. 13 is a side view of a slider in a modified example according to the invention.

According to this embodiment, end surface 62*a* of the inner portion of slider 62 in the vehicle width direction extends toward the radially outside while inclined toward the outside in the vehicle width direction. However, end surface 62*a* need not have such an inclined surface as long as the radially outer portion of end surface 62*a* is positioned outside the radially inner portion thereof in the vehicle width direction. For example, end surface 62*a* may have a stepwise shape in side view as illustrated in FIG. 13.

The straddle-type vehicle according to the invention is not limited to an off-road-type motorcycle, but may be a motorcycle of another type such as a motorcycle type, a motor-scooter type, a so-called moped type and other types of motorcycle. The invention is also applicable to straddle-type vehicles other than motorcycles such as all terrain vehicles (ATVs).

The description "end surface 62*a* and the inside surface of plate main body 61 in the vehicle width direction are leveled with each other" in this specification includes the condition where end surface 62*a* and the inside surface of plate main body 61 in the vehicle width direction are shifted from each other to such an extent that no problem occurs in practical use as well as the condition where end surface 62*a* and the inside surface of plate main body 61 in the vehicle width direction are perfectly leveled with each other.

The description "the portion of the plate main body opposed to the guide member is notched" herein includes not only the condition where a part of the plate main body is practically notched but also the condition where the portion of the plate main body opposed to the guide member has a notched shape produced for some reason. Thus, the forming steps and forming method of the notch are not specifically limited. For example, a plate main body having a shape that includes a notched part opposed to the guide member may be formed by a single pressing step.

The invention is applicable to a straddle-type vehicle having a belt-type continuously variable transmission.

The particular embodiments of the invention described in this document should be considered illustrative, rather than restrictive. Modification to the described embodiments may be made without departing from the spirit of the invention as defined by the following claims.

The invention claimed is:

1. A belt-type continuously variable transmission, comprising:
    a primary sheave which rotates around a rotation axis;
    a secondary sheave; and
    a belt wound around the primary sheave and the secondary sheave,
    wherein the primary sheave includes
    a first sheave member that can shift in a rotation axis extending direction,
    a second sheave member shifted from the first sheave member toward one side of the rotation axis extending direction and opposed to the first sheave member, the first sheave member and the second sheave member forming a belt groove around which the belt is wound,
    a cam plate shifted from the first sheave member toward the other side of the rotation axis extending direction and opposed to the first sheave member, the cam plate and the first sheave member forming a space that narrows toward a radially outside portion of the first sheave member, and
    a pressing member disposed in the space to narrow the width of the belt groove by shifting toward the radially outside portion of the first sheave member while pressing the first sheave member against the second sheave member by centrifugal force generated by circling of the pressing member around the rotation axis in accordance with rotation of the first sheave member, wherein
    the first sheave member has a guide member extending toward the cam plate,
    the cam plate has a slide member having a guide groove engaging with the guide member such that the slide member can slide relative to the guide member, and
    a position of a radially outer portion of an end surface of the slide member on the other side of the rotation axis extending direction is shifted toward the one side of the rotation axis extending direction from the position of the radially inner portion of the end surface of the slide member on the other side of the rotation axis extending direction,
    wherein the slide member has a substantially trapezoidal shape in side view having the radially outer portion shorter than the radially inner portion in the rotation axis direction.

2. The belt-type continuously variable transmission according to claim 1, wherein:
    the cam plate has a plate main body having a notch on which the slide member is provided; and
    the slide member is provided separately from the plate main body.

3. The belt-type continuously variable transmission according to claim 2, wherein:
    the slide member has a slide member main body having the guide groove, and an engaging portion formed on the outer side of the slide member main body to engage with the notch of the plate main body and regulate the shift of the slide member main body in the rotation axis direction relative to the plate main body.

4. The belt-type continuously variable transmission according to claim 3, wherein the portion of the notch engaging with the engaging portion is bended in the rotation axis direction.

5. The belt-type continuously variable transmission according to claim 3, wherein the engaging portion has a linear shape extending along the plate main body while inclined to the rotation axis direction.

6. The belt-type continuously variable transmission according to claim 1, wherein:
- the cam plate has a plate main body having a notch on which the slide member is provided; and
- the end surface is leveled with the surface of the plate main body on the other side of the rotation axis extending direction.

7. A straddle-type vehicle comprising the belt-type continuously variable transmission according to claim 1.

8. A belt-type continuously variable transmission, comprising:
- a primary sheave which rotates around a rotation axis;
- a secondary sheave; and
- a belt wound around the primary sheave and the secondary sheave,
- wherein the primary sheave includes
- a first sheave member that can shift in a rotation axis extending direction,
- a second sheave member shifted from the first sheave member toward one side of the rotation axis extending direction and opposed to the first sheave member, the first sheave member and the second sheave member forming a belt groove around which the belt is wound,
- a cam plate shifted from the first sheave member toward the other side of the rotation axis extending direction and opposed to the first sheave member, the cam plate and the first sheave member forming a space that narrows toward a radially outside portion of the first sheave member, and
- a pressing member disposed in the space to narrow the width of the belt groove by shifting toward the radially outside portion of the first sheave member while pressing the first sheave member against the second sheave member by centrifugal force generated by circling of the pressing member around the rotation axis in accordance with rotation of the first sheave member, wherein
- the first sheave member has a guide member extending toward the cam plate,
- the cam plate has a slide member having a guide groove engaging with the guide member such that the slide member can slide relative to the guide member, and
- a position of a radially outer portion of an end surface of the slide member on the other side of the rotation axis extending direction is shifted toward the one side of the rotation axis extending direction from the position of the radially inner portion of the end surface of the slide member on the other side of the rotation axis extending direction,
- wherein the cam plate has a plate main body having a notch on which the slide member is provided;
- the slide member is provided separately from the plate main body,
- wherein the slide member has a slide member main body having the guide groove, and an engaging portion formed on the outer side of the slide member main body to engage with the notch of the plate main body and regulate the shift of the slide member main body in the rotation axis direction relative to the plate main body,
- wherein the portion of the notch engaging with the engaging portion is bended in the rotation axis direction.

* * * * *